US008904089B2

(12) United States Patent
Shen

(10) Patent No.: US 8,904,089 B2
(45) Date of Patent: Dec. 2, 2014

(54) METHOD FOR PERFORMING BLOCK MANAGEMENT/FLASH MEMORY MANAGEMENT, AND ASSOCIATED MEMORY DEVICE AND CONTROLLER THEREOF

(75) Inventor: Yang-Chih Shen, Taipei (TW)

(73) Assignee: Silicon Motion Inc., Jhubei, Hsinchu County (TW)

( * ) Notice: Subject to any disclaimer, the term of this patent is extended or adjusted under 35 U.S.C. 154(b) by 561 days.

(21) Appl. No.: 13/211,332

(22) Filed: Aug. 17, 2011

(65) Prior Publication Data

US 2012/0173797 A1     Jul. 5, 2012

(30) Foreign Application Priority Data

Dec. 31, 2010   (TW) ............................... 99147196 A

(51) Int. Cl.
*G06F 12/02*       (2006.01)

(52) U.S. Cl.
CPC .... *G06F 12/0246* (2013.01); *G06F 2212/7205* (2013.01); *G06F 2212/7208* (2013.01)
USPC ........................................................ 711/103

(58) Field of Classification Search
None
See application file for complete search history.

(56) References Cited

U.S. PATENT DOCUMENTS

| 7,624,239 | B2 | 11/2009 | Bennett |
| 7,783,845 | B2 | 8/2010 | Bennett |
| 8,108,590 | B2 * | 1/2012 | Chow et al. ................... 711/103 |
| 2005/0144516 | A1 | 6/2005 | Gonzalez |
| 2008/0109588 | A1 | 5/2008 | Yun |
| 2008/0228992 | A1 | 9/2008 | Dumitru |
| 2008/0250195 | A1 | 10/2008 | Chow |
| 2008/0288712 | A1 | 11/2008 | Cornwell |
| 2009/0300274 | A1 | 12/2009 | Luo |
| 2010/0287217 | A1 * | 11/2010 | Borchers et al. .............. 707/813 |
| 2012/0084489 | A1 * | 4/2012 | Gorobets et al. .............. 711/103 |

* cited by examiner

*Primary Examiner* — Jared Rutz
(74) *Attorney, Agent, or Firm* — Winston Hsu; Scott Margo

(57) ABSTRACT

A method for performing block management is provided. The method is applied to a controller of a Flash memory having multiple channels. The Flash memory includes a plurality of blocks respectively corresponding to the channels. The method includes: selecting at least one meta block having at least one valid page as at least one candidate meta block for being cleaned, and accumulating respective valid page counts of blocks respectively corresponding to the channels within the at least one candidate meta block, in order to generate a plurality of accumulated values respectively corresponding to the channels; and when it is detected that all of the accumulated values reach a threshold value, triggering a cleaning operation with regard to all candidate meta blocks, in order to simultaneously move/copy valid data respectively corresponding to the channels during the cleaning operation. An associated memory device and a controller thereof are also provided.

27 Claims, 10 Drawing Sheets

METHOD FOR PERFORMING BLOCK MANAGEMENT/FLASH MEMORY MANAGEMENT, AND ASSOCIATED MEMORY DEVICE AND CONTROLLER THEREOF

BACKGROUND OF THE INVENTION

1. Field of the Invention

The present invention relates to access to a Flash memory having multiple channels, and more particularly, to a method for performing block management/Flash memory management, and to an associated memory device and a controller thereof.

2. Description of the Prior Art

As technologies of Flash memories progress in recent years, many kinds of portable memory devices (e.g. memory cards respectively complying with SD/MMC, CF, MS, and XD standards) or solid state drives (SSDs) equipped with Flash memories are widely implemented in various applications. Therefore, the control of access to Flash memories in these memory devices has become an important issue.

Taking NAND Flash memories as an example, they can mainly be divided into two types, i.e. Single Level Cell (SLC) Flash memories and Multiple Level Cell (MLC) Flash memories. Each transistor that is considered a memory cell in SLC Flash memories only has two charge levels that respectively represent a logical value 0 and a logical value 1. In addition, the storage capability of each transistor that is considered a memory cell in MLC Flash memories can be fully utilized. More specifically, the voltage for driving memory cells in the MLC Flash memories is typically higher than that in the SLC Flash memories, and different voltage levels can be applied to the memory cells in the MLC Flash memories in order to record information of at least two bits (e.g. binary values 00, 01, 11, or 10) in a transistor that is considered a memory cell. Theoretically, the storage density of the MLC Flash memories may reach twice the storage density of the SLC Flash memories, which is considered good news for NAND Flash memory manufacturers who encountered a bottleneck of NAND Flash technologies.

As MLC Flash memories are cheaper than SLC Flash memories, and are capable of providing higher capacity than SLC Flash memories while the space is limited, MLC Flash memories have been a main stream for implementation of most portable memory devices on the market. However, various problems of the MLC Flash memories have arisen due to their unstable characteristics. In order to ensure that the access control of a memory device over the Flash memory therein can comply with related standards, the controller of the Flash memory should have some handling mechanisms in order to properly handle its data access operations.

According to the related art, the memory device having the aforementioned handling mechanisms may still suffer from some deficiencies. For example, the handling mechanisms of the related art cannot ensure that the best processing performance of a Flash memory adapted to have multiple channel configurations can be achieved during a cleaning operation. More particularly, during a cleaning operation with regard to a meta block, if there is no valid page in a certain channel within the meta block, the channel is in an idle state when operations of moving/copying valid data of the meta block are performed. Therefore, a novel method is required for performing block management in order to achieve the best processing performance during a cleaning operation.

SUMMARY OF THE INVENTION

It is therefore an objective of the claimed invention to provide a method for performing block management/Flash memory management, and to provide an associated memory device and a controller thereof, in order to solve the above-mentioned problems.

It is another objective of the claimed invention to provide a method for performing block management/Flash memory management, and to provide an associated memory device and a controller thereof, in order to achieve the best processing performance during a cleaning operation.

According to a preferred embodiment of the present invention, a method for performing block management is provided. The method is applied to a controller of a Flash memory having multiple channels, wherein the Flash memory comprises a plurality of blocks respectively corresponding to the channels. The method comprises: selecting at least one meta block having at least one valid page as at least one candidate meta block for being cleaned, and accumulating respective valid page counts of blocks respectively corresponding to the channels within the at least one candidate meta block, in order to generate a plurality of accumulated values respectively corresponding to the channels, wherein blocks of each meta block respectively correspond to the channels, and data of each valid page comprises valid data; and when it is detected that all of the accumulated values reach a first threshold value, triggering a cleaning operation with regard to all candidate meta blocks, in order to simultaneously move/copy valid data respectively corresponding to the channels during the cleaning operation.

While the method mentioned above is disclosed, an associated memory device is further provided. The memory device comprises: a Flash memory having multiple channels, wherein the Flash memory comprises a plurality of blocks respectively corresponding to the channels; and a controller arranged to access the Flash memory and manage the plurality of blocks. In addition, the controller selects at least one meta block having at least one valid page as at least one candidate meta block for being cleaned, and accumulates respective valid page counts of blocks respectively corresponding to the channels within the at least one candidate meta block, in order to generate a plurality of accumulated values respectively corresponding to the channels, wherein blocks of each meta block respectively correspond to the channels, and data of each valid page comprises valid data. Additionally, when it is detected that all of the accumulated values reach a first threshold value, the controller triggers a cleaning operation with regard to all candidate meta blocks, in order to simultaneously move/copy valid data respectively corresponding to the channels during the cleaning operation.

While the method mentioned above is disclosed, a controller of a memory device is further provided. The controller is utilized for accessing a Flash memory having multiple channels, wherein the Flash memory comprises a plurality of blocks respectively corresponding to the channels. The controller comprises: a read only memory (ROM) arranged to store a program code; and a microprocessor arranged to execute the program code to control the access to the Flash memory and manage the plurality of blocks. In addition, the controller that executes the program code by utilizing the microprocessor selects at least one meta block having at least one valid page as at least one candidate meta block for being cleaned, and accumulates respective valid page counts of blocks respectively corresponding to the channels within the at least one candidate meta block, in order to generate a plurality of accumulated values respectively corresponding to the channels, wherein blocks of each meta block respectively correspond to the channels, and data of each valid page comprises valid data. Additionally, when it is detected that all of the accumulated values reach a first threshold value, the controller that executes the program code by utilizing the microprocessor triggers a cleaning operation with regard to all candidate meta blocks, in order to simultaneously move/copy valid data respectively corresponding to the channels during the cleaning operation.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
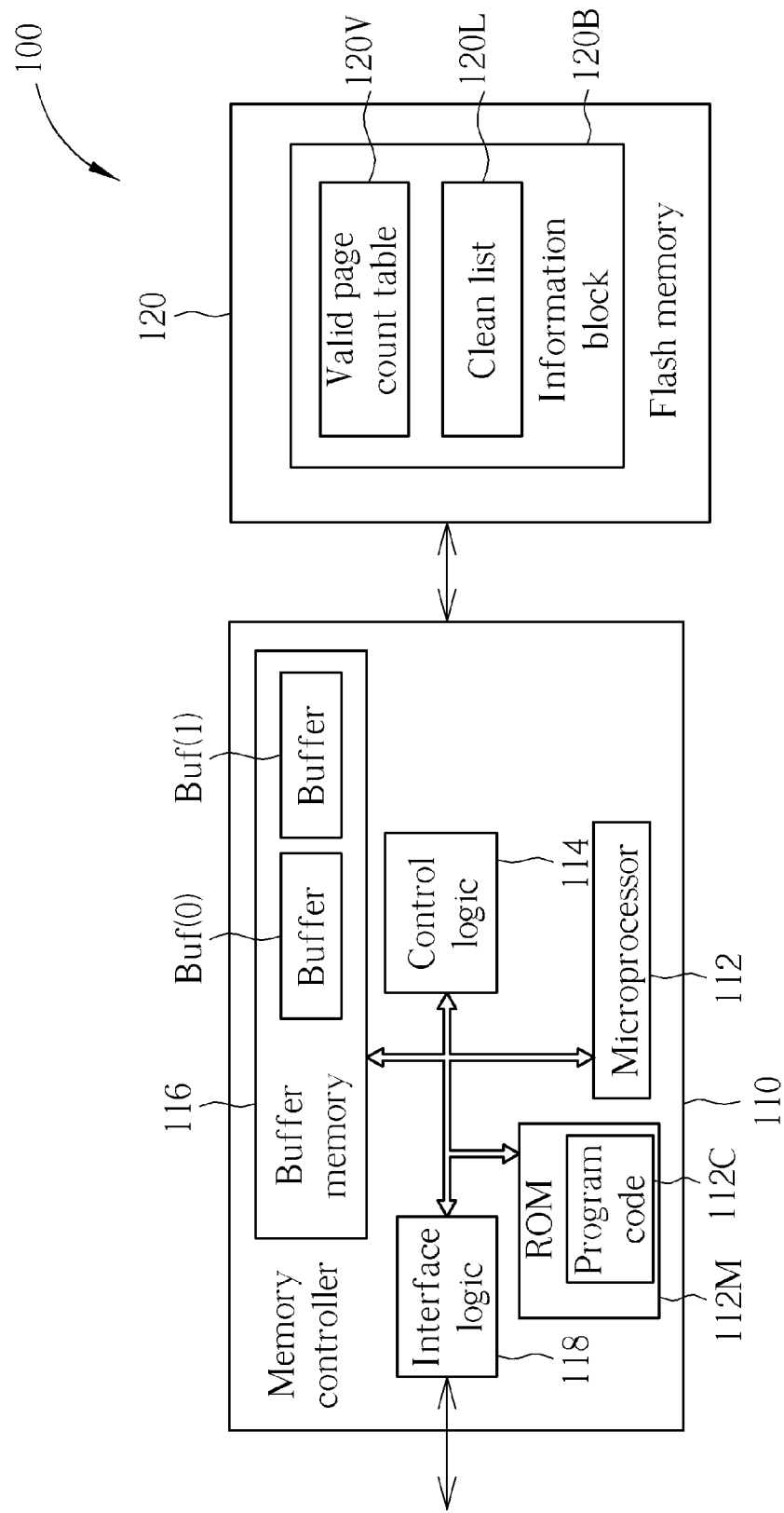
FIG. 1A is a diagram of a memory device according to a first embodiment of the present invention.

Please refer to FIG. 1A, which illustrates a diagram of a memory device 100 according to a first embodiment of the present invention. In particular, the memory device 100 of this embodiment can be a portable memory device, examples of which may include, but not limited to, memory cards complying with SD/MMC, CF, MS, or XD standards. Here, the portable memory device is taken as an example of the memory device 100 in this embodiment. This is for illustrative purposes only, and is not meant to be a limitation of the present invention. According to a variation of this embodiment, the memory device 100 can be a solid state drive (SSD). Referring to FIG. 1A, the memory device 100 comprises a Flash memory 120 comprising at least one information block 120B, and further comprises a controller arranged to access the Flash memory 120, where the aforementioned controller of this embodiment is a memory controller 110. According to this embodiment, the memory controller 110 comprises a microprocessor 112, a read only memory (ROM) 112M, a control logic 114, at least one buffer memory 116, and an interface logic 118. In addition, the ROM 112M is arranged to store a program code 112C, and the microprocessor 112 is arranged to execute the program code 112C to control the access to the Flash memory 120. Please note that the program code 112C can be stored in the buffer memory 116 or any of various kinds of memories according to variations of this embodiment.

As shown in FIG. 1A, the aforementioned at least one information block 120B is utilized for storing information regarding block management, and more particularly, a valid page count table 120V and a clean list 120L. The valid page count table 120V can be utilized for recording valid page counts (in which a valid page count is the number of some valid pages) and valid page distribution (i.e. the distribution of valid pages) within the Flash memory 120. In practice, the valid page count table 120V can be recorded according to various kinds of methods. According to the valid page count table 120V, the aforementioned controller (e.g. the memory controller 110 that executes the program code 112C by utilizing the microprocessor 112) can rapidly obtain the respective valid page counts of respective blocks belonging to the same meta block. In addition, the clean list 120L can be utilized for dynamically recording the indexes of some meta blocks to be cleaned. When some condition(s) are satisfied, the controller can rapidly clean the meta blocks indicated by the indexes in the clean list 120L. For example, the controller can move/copy the valid data of these meta blocks to some other location in the Flash memory 120, and erase these meta blocks. Please note that any information stored in the information block 120B can be stored into the memory controller 110 (e.g. into the buffer memory 116), or into any memory that can be accessed by the memory controller 110. Here, storing the valid page count table 120V and the clean list 120L in the Flash memory 120 is taken as an example in this embodiment, and is not meant to be a limitation of the present invention. As long as the implementation of the present invention is not hindered, the valid page count table 120V and the clean list 120L can be stored in any memory that can be accessed by the memory controller 110, no matter whether this memory is within or outside the memory controller 110.

According to this embodiment, the buffer memory 116 comprises buffers Buf(0) and Buf(1). For example, the buffers Buf(0) and Buf(1) can be a plurality of buffering regions within the buffer memory 116, respectively. In another example, the aforementioned at least one buffer memory 116 comprises a plurality of buffer memories, which can be utilized for implementing the buffers Buf(0) and Buf(1), respectively. In this embodiment, the aforementioned controller (e.g. the memory controller 110 that executes the program code 112C by utilizing the microprocessor 112) can store a previous version of (a portion or all of) the valid page count table 120V into the Flash memory 120, and store a copy version of the valid page count table 120V into the buffer Buf(0), for use of dynamically updating the valid page count table 120V. In addition, the controller stores the latest version of the valid page count table 120V within the buffer Buf(0) into the Flash memory 120, in order to replace the previous version of the valid page count table 120V. Similarly, the controller can store a previous version of (a portion or all of) the clean list 120L into the Flash memory 120, and store a copy version of the clean list 120L into the buffer Buf(1), for use of dynamically updating the clean list 120L. In addition, the controller stores the latest version of the clean list 120L within the buffer Buf(1) into the Flash memory 120, in order to replace the previous version of the clean list 120L. This is for illustrative purposes only, and is not meant to be a limitation of the present invention. As long as the implementation of the present invention is not hindered, the aforementioned updating/replacing operations can be performed with regard to a portion or all of any of the valid page count table 120V and the clean list 120L.

Figure 1B:
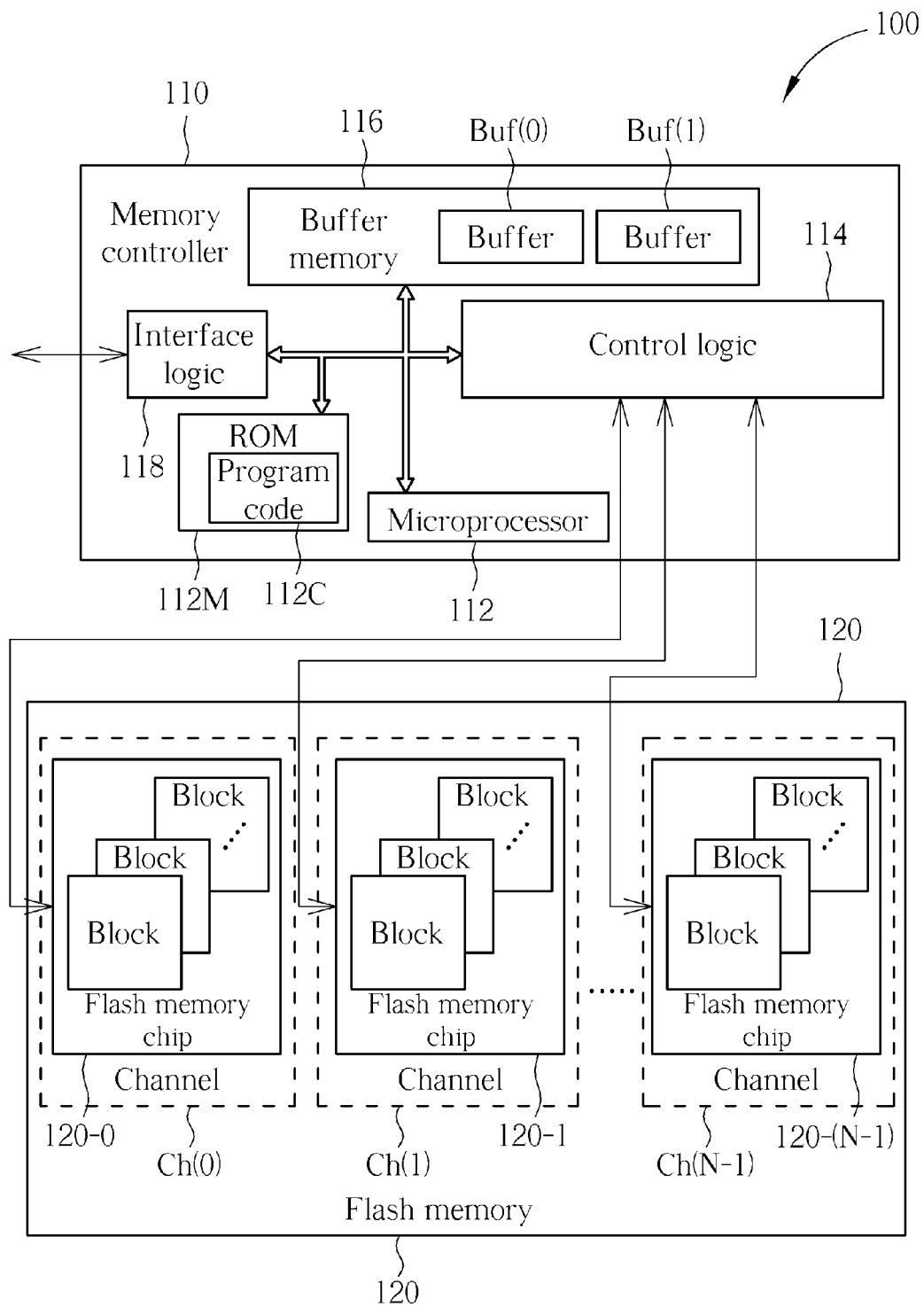
FIG. 1B illustrates some implementation details of the memory device shown in FIG. 1A according to an embodiment of the present invention.

FIG. 1B illustrates some implementation details of the memory device 100 shown in FIG. 1A according to an embodiment of the present invention. As shown in FIG. 1B, the aforementioned Flash memory 120 comprises a plurality of Flash memory chips such as the Flash memory chips 120-0, 120-1, ..., and 120-(N−1), where the Flash memory 120 communicates with the memory controller 110 through multiple channels such as the channels Ch(0), Ch(1), ..., and Ch(N−1), and the Flash memory chips such as the Flash memory chips 120-0, 120-1, ..., and 120-(N−1) respectively correspond to the channels. Typically, in addition to the aforementioned at least one information block 120B, the Flash memory 120 further comprises a plurality of blocks respectively corresponding to the channels, and when the controller (e.g. the memory controller 110 that executes the program code 112C by utilizing the microprocessor 112) performs data erasure operations on the Flash memory chips, the minimum erasure unit can be a block. In this embodiment, the controller performs data erasure operations in units of meta blocks, where a meta block may comprise some blocks respectively corresponding to the channels, and the controller can erase the Flash memory 120 with the meta block being a minimum erasure unit. For example, a meta block may comprise a block of the Flash memory chip 120-0, a block of the Flash memory chip 120-1, . . . , and a block of the Flash memory chip 120-(N−1). In addition, a block can be utilized for recording a specific amount of pages, and when the controller performs data writing operations on any of the Flash memory chips, the minimum writing unit can be a page.

In practice, the memory controller 110 that executes the program code 112C by utilizing the microprocessor 112 is capable of performing various control operations by utilizing the internal components within the memory controller 110. For example, the memory controller 110 utilizes the control logic 114 to control access to each Flash memory chip (e.g. operations of accessing at least one block or at least one page), utilizes the buffer memory 116 to perform buffering operations for the memory controller 110, and utilizes the interface logic 118 to communicate with a host device.

Figure 2A:
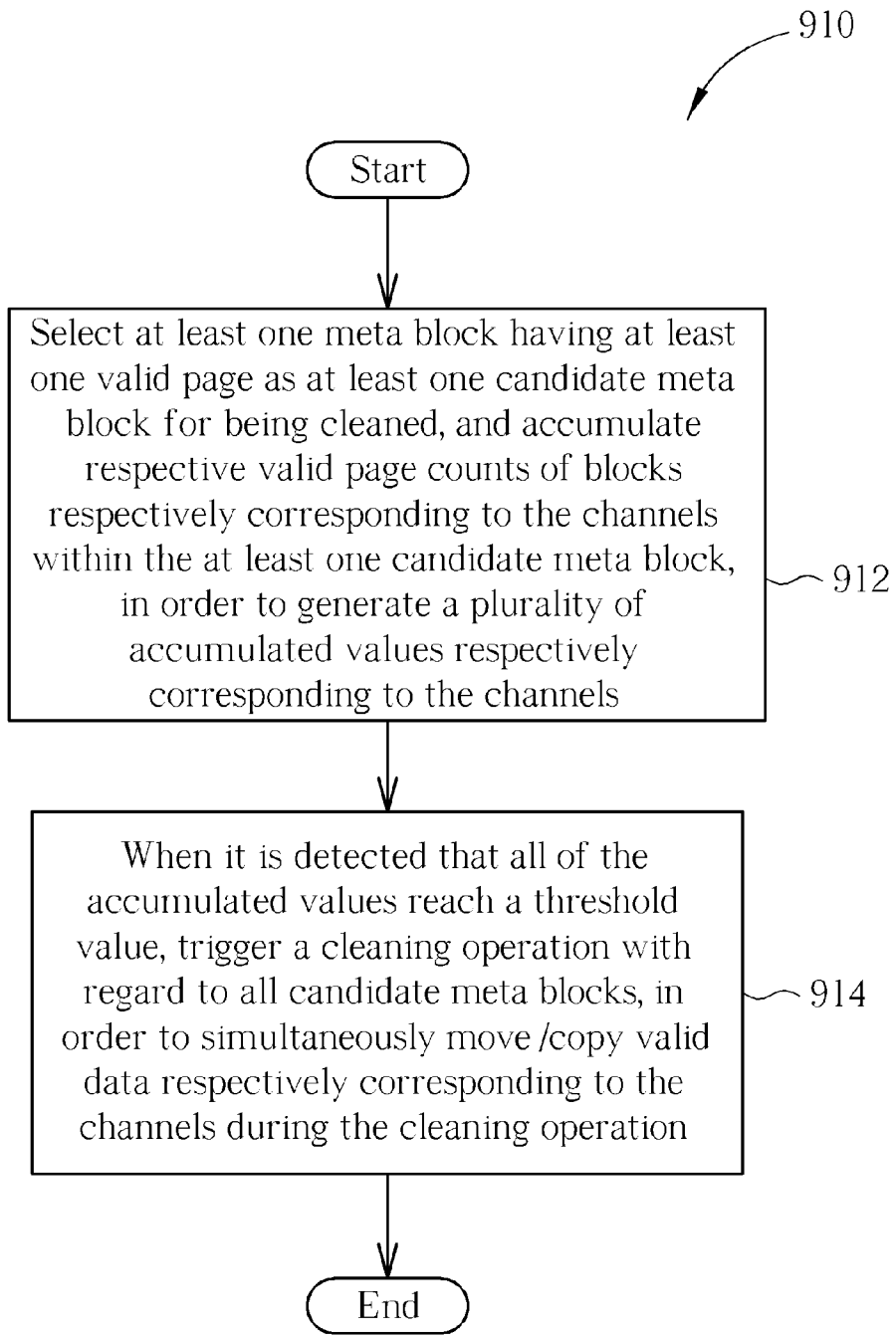
FIG. 2A is a flowchart of a method for performing block management according to an embodiment of the present invention.

According to this embodiment, in addition to accessing the Flash memory 120, the memory controller 110 is capable of properly managing the plurality of blocks mentioned above. More specifically, the controller can dynamically select some meta block(s) as candidate meta block(s) for being cleaned, and dynamically update the clean list 120L, for reference of cleaning meta blocks. In addition, the controller can dynamically update the valid page count table 120V, for use of block management, and for reference of cleaning meta blocks. Referring to FIG. 2A, related details are further described as follows.

FIG. 2A is a flowchart of a method 910 for performing block management according to an embodiment of the present invention. The method can be applied to the memory device 100 in any of the respective embodiments shown in FIGS. 1A-1B (and associated variations), and more particularly, the controller of the Flash memory 120 adapted to have multiple channel configurations, such as the aforementioned controller (e.g. the memory controller 110 that executes the program code 112C by utilizing the microprocessor 112). The method is described as follows.

In Step 912, the controller selects at least one meta block M(m) having at least one valid page (e.g. a meta block M(m) or multiple meta blocks {M(m)}, where each meta block M(m) has at least one valid page) as at least one candidate meta block for being cleaned, and accumulates respective valid page counts $\{VPC_m(0), VPC_m(1), \ldots, VPC_m(N-1)\}$ of blocks respectively corresponding to the channels {Ch(0), Ch(1), . . . , Ch(N−1)} within the aforementioned at least one candidate meta block, in order to generate a plurality of accumulated values $\{VPC_A(0), VPC_A(1), \ldots, VPC_A(N-1)\}$ respectively corresponding to the channels {Ch(0), Ch(1), . . . , Ch(N−1)}, where the respective blocks of each meta block respectively correspond to the channels, and the data of each valid page comprises valid data. More particularly, within a plurality of meta blocks (e.g. some meta blocks continuously checked by the controller), the controller can select a meta block having the least number of valid pages as a candidate meta block, where the requirement that the meta block has at least one valid page should be satisfied. For example, in a situation where the aforementioned at least one meta block is merely one meta block M(m), the controller can select a meta block having the least number of valid pages from a batch of meta blocks that are continuously checked by the controller itself as a candidate meta block. In another example, in a situation where the aforementioned at least one meta block comprises multiple meta blocks {M(m)}, the controller can select a meta block having the least number of valid pages from a first batch of meta blocks that are continuously checked by the controller itself as a first candidate meta block, and further select a meta block having the least number of valid pages from a second batch of meta blocks that are continuously checked by the controller itself as a second candidate meta block, and the rest may be deduced by analogy.

According to this embodiment, the controller temporarily stores at least one index m of the aforementioned at least one meta block M(m) (e.g. an index m or multiple indexes {m}) in the clean list 120L, in order to label the aforementioned at least one meta block M(m) as the aforementioned at least one candidate meta block. For example, the aforementioned at least one index m corresponds to at least one set of physical block addresses. More particularly, the aforementioned at least one set of physical block addresses are physical block addresses of the respective blocks within the meta block M(m), where the relationship between the index m and the set of physical block addresses can be recorded according to various kinds of methods. This is for illustrative purposes only, and is not meant to be a limitation of the present invention. According to different variations of this embodiment, the aforementioned at least one index m may represent at least one set of physical block addresses and/or the aforementioned at least one index m may correspond to at least one set of physical block addresses. Please note that a set of physical block addresses disclosed above can be replaced by a set of logical block addresses, such as the logical block addresses that the respective blocks within the meta block M(m) correspond.

In Step 914, when it is detected that all of the accumulated values $\{VPC_A(0), VPC_A(1), \ldots, VPC_A(N-1)\}$ reach a first threshold value such as the threshold value $TH_A$, the controller triggers a cleaning operation with regard to all candidate meta blocks, in order to simultaneously move/copy the valid data respectively corresponding to the channels {Ch(0), Ch(1), . . . , Ch(N−1)} during the cleaning operation, and more particularly, to simultaneously move/copy the valid data to at least one other meta block during the cleaning operation. According to this embodiment, with regard to the utilization states of the respective meta blocks, the controller can utilize a data region and a spare region within the Flash memory 120 to classify the meta blocks, where the data region and the spare region represent (or correspond to) logical region division, rather than physical region division. Please note that any meta block that is classified into the data region is not a blank meta block, and any meta block that is classified into the spare region is a blank meta block. When a new blank meta block is needed (e.g. new blank meta block is utilized for being written/programmed), the controller can pop a meta block from the spare region to perform a writing operation. In order to prevent a problem that the number of meta blocks in the spare region is not enough, the controller can erase a portion of meta blocks in the data region in advance to re-classify these meta blocks into the spare region, where by performing the cleaning operation mentioned above, the controller can prevent any valid data (if exists) within these meta blocks from being lost, and more particularly, prevent the valid data within the candidate meta blocks mentioned above from being lost.

For example, the indexes {m} of the candidate meta blocks are temporarily stored in the clean list 120L, respectively. When it is detected that all of the accumulated values {$VPC_A(0)$, $VPC_A(1)$, ..., $VPC_A(N-1)$} reach the threshold value $TH_A$, the controller triggers the cleaning operation with regard to the candidate meta blocks indicated by the indexes {m}, in order to simultaneously move/copy the valid data respectively corresponding to the channels {Ch(0), Ch(1), ..., Ch(N-1)} during the cleaning operation. As a result, by simultaneously performing the moving/copying operations of the respective channels {Ch(0), Ch(1), ..., Ch(N-1)}, the present invention can efficiently move/copy all of the valid data involved with the cleaning operation, so the ratio $R_{ALL\_CH}$ of the time $T_{ALL\_CH}$ that the moving/copying operations of the respective channels are performed at the same time to the total time $T_{TOTAL}$ of all of the moving/copying operations involved with the cleaning operation in this embodiment can be much greater than that of the related art, and more particularly, can even approach 1 in an ideal situation. Therefore, the present invention can greatly enhance the overall processing performance of the memory device.

In practice, after triggering the cleaning operation, the controller can remove the aforementioned at least one index m from the clean list 120L, and more particularly, remove the index {m} of the candidate meta blocks mentioned in Step 914 from the clean list 120L. After moving/copying the valid data to other location(s) (e.g. other meta block(s)), the controller can erase the candidate meta blocks to generate new blank meta blocks, where each block within the new blank meta blocks is a blank block. In addition, the threshold value $TH_A$ can be a fixed value. This is for illustrative purposes only, and is not meant to be a limitation of the present invention. According to different variations of this embodiment, the controller can set the threshold value $TH_A$ in advance and/or dynamically adjust the threshold value $TH_A$, in order to control the aforementioned ratio $R_{ALL\_CH}$.

According to a variation of this embodiment, the controller can perform a partially cleaning operation, i.e. the cleaning operation performed in a situation where the threshold value $TH_A$ is less than the number of pages in a block. For example, the threshold value $TH_A$ can be a fixed value that is less than the number of pages in a block. In another example, the controller can dynamically adjust the threshold value $TH_A$, and more particularly, dynamically adjust the threshold value $TH_A$ to happen to be a certain value at present, where the value is less than the number of pages in a block. Typically, during moving/copying the valid data to other location(s) (e.g. other meta block(s)), the controller can merely wait, and the host device is typically forced to wait and cannot access the memory device 100 right away, so if the threshold value $TH_A$ is too high, the performance of the controller may be degraded and accessing the memory device 100 by the controller may be hindered.

Please note that the valid page count of the meta block M(m) represented by the index m stored in the clean list 120L may probably be decreased as some subsequent writing operations are performed. More particularly, in a situation where the threshold value $TH_A$ is less than the number of pages in a block, the probability that the valid page count of the meta block M(m) represented by the index m stored in the clean list 120L is decreased may be increased. Although the meta block M(m) represented by the index m indeed has at least one valid page when the controller temporarily stores the index m in the clean list 120L, this by no means implies that the aforementioned at least one valid page will never become at least one invalid page. For example, after the subsequent writing operations mentioned above are performed, the data of the aforementioned at least one valid page will probably become invalid data due to the corresponding update data being written, which may cause the meta block M(m) to become a meta block that has no valid page.

Figure 2B:
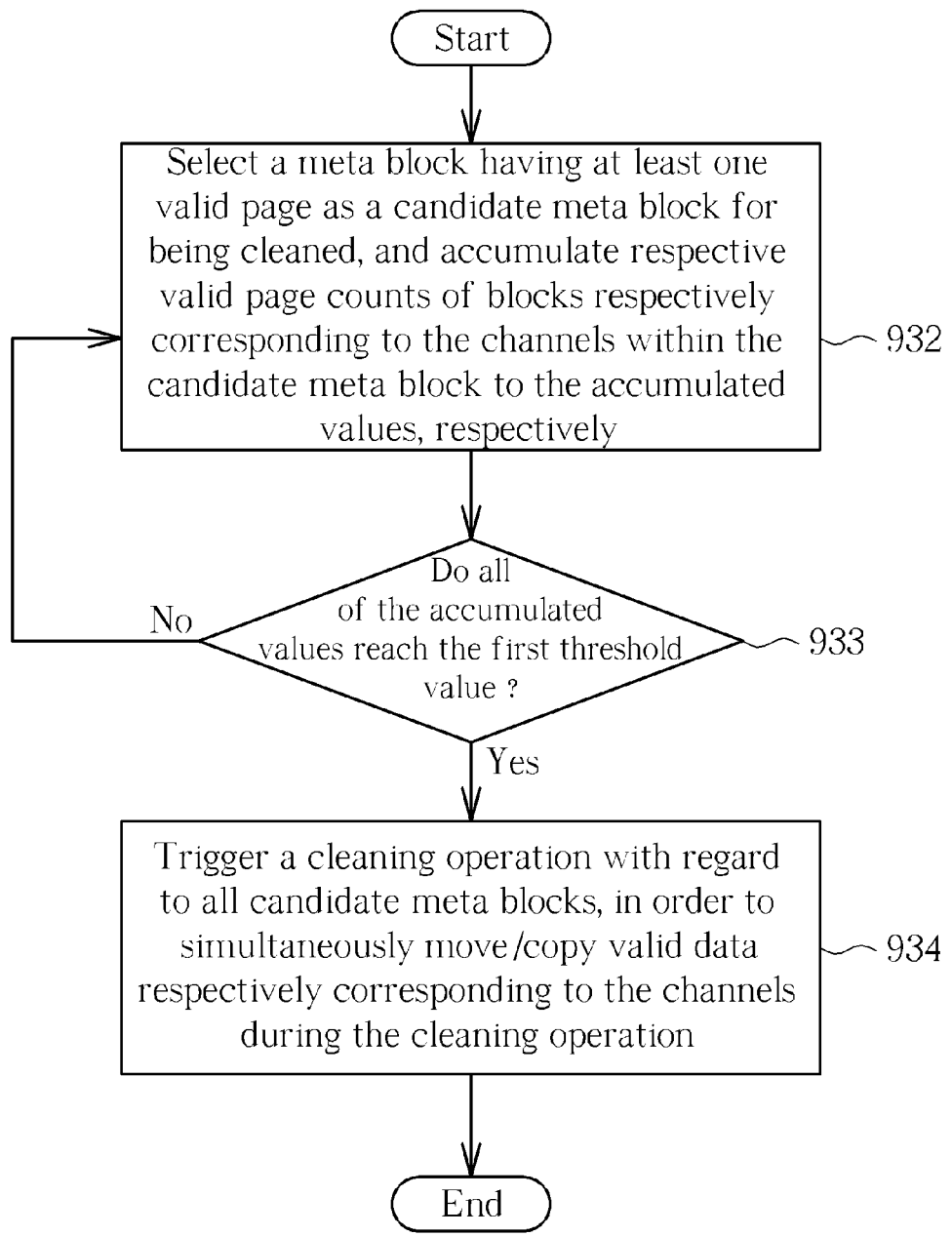
FIG. 2B illustrates some implementation details of the method shown in FIG. 2A according to an embodiment of the present invention.

FIG. 2B illustrates some implementation details of the method shown in FIG. 2A according to an embodiment of the present invention. The working flow shown in FIG. 2B is described as follows.

In Step 932, the controller selects a meta block having at least one valid page, such as the meta block M(m), as a candidate meta block for being cleaned, and accumulates the respective valid page counts {$VPC_m(0)$, $VPC_m(1)$, ..., $VPC_m(N-1)$} of blocks respectively corresponding to the channels {Ch(0), Ch(1), ..., Ch(N-1)} within the candidate meta block to the accumulated values {$VPC_A(0)$, $VPC_A(1)$, ..., $VPC_A(N-1)$}, respectively.

In Step 933, the controller checks whether all of the accumulated values {$VPC_A(0)$, $VPC_A(1)$, ..., $VPC_A(N-1)$} reach the first threshold value such as the threshold value $TH_A$. When it is detected that all of the accumulated values {$VPC_A(0)$, $VPC_A(1)$, ..., $VPC_A(N-1)$} reach the first threshold value, Step 934 is entered; otherwise, Step 932 is re-entered.

In Step 934, the controller triggers a cleaning operation with regard to all candidate meta blocks, in order to simultaneously move/copy the valid data respectively corresponding to the channels {Ch(0), Ch(1), ..., Ch(N-1)} during the cleaning operation.

According to this embodiment, the controller can decrease the ratio of the idle time of at least one idle channel (i.e., the time that one or more channels are in their idle states) to the overall time of the cleaning operation as best it can. More particularly, the controller can simultaneously move/copy the valid data respectively corresponding to the channels {Ch(0), Ch(1), ..., Ch(N-1)} during the cleaning operation, so the aforementioned ratio $R_{ALL\_CH}$ in this embodiment can be much greater than that of the related art. Therefore, the present invention can greatly enhance the overall processing performance of the memory device.

Figure 3A:
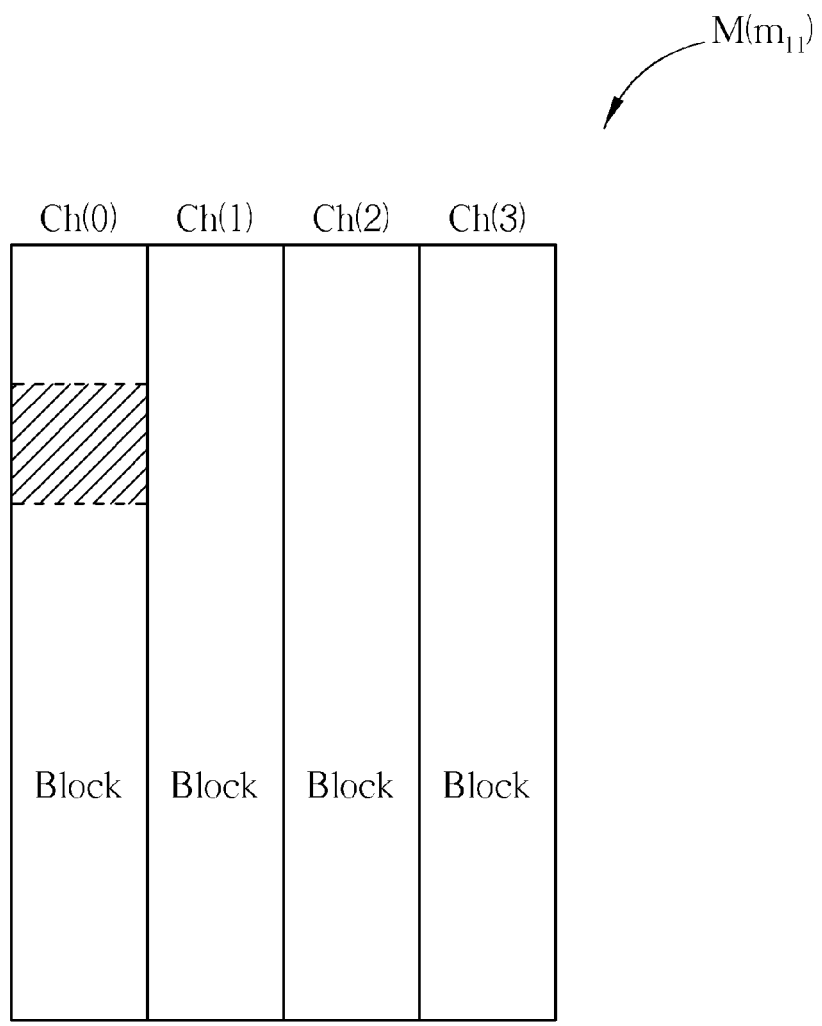
FIGS. 3A-3D respectively illustrate some candidate meta blocks involved with the method shown in FIG. 2A according to an embodiment of the present invention.
Figure 3B:
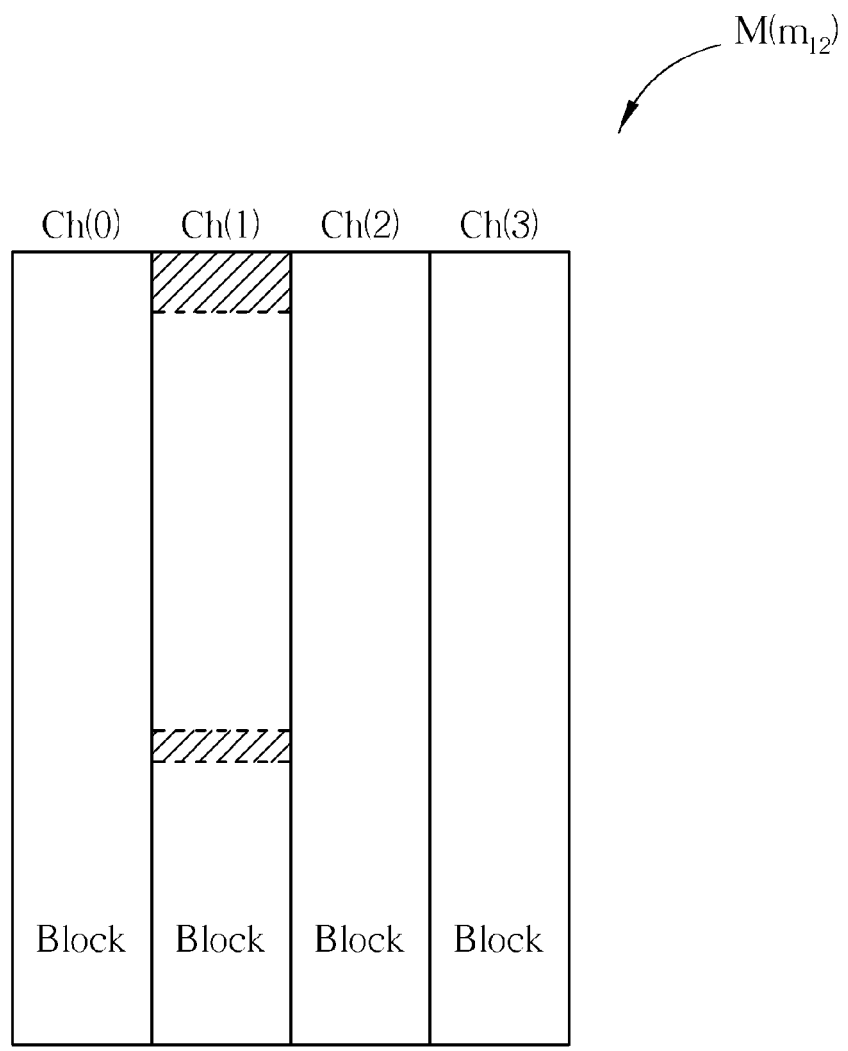
Figure 3C:
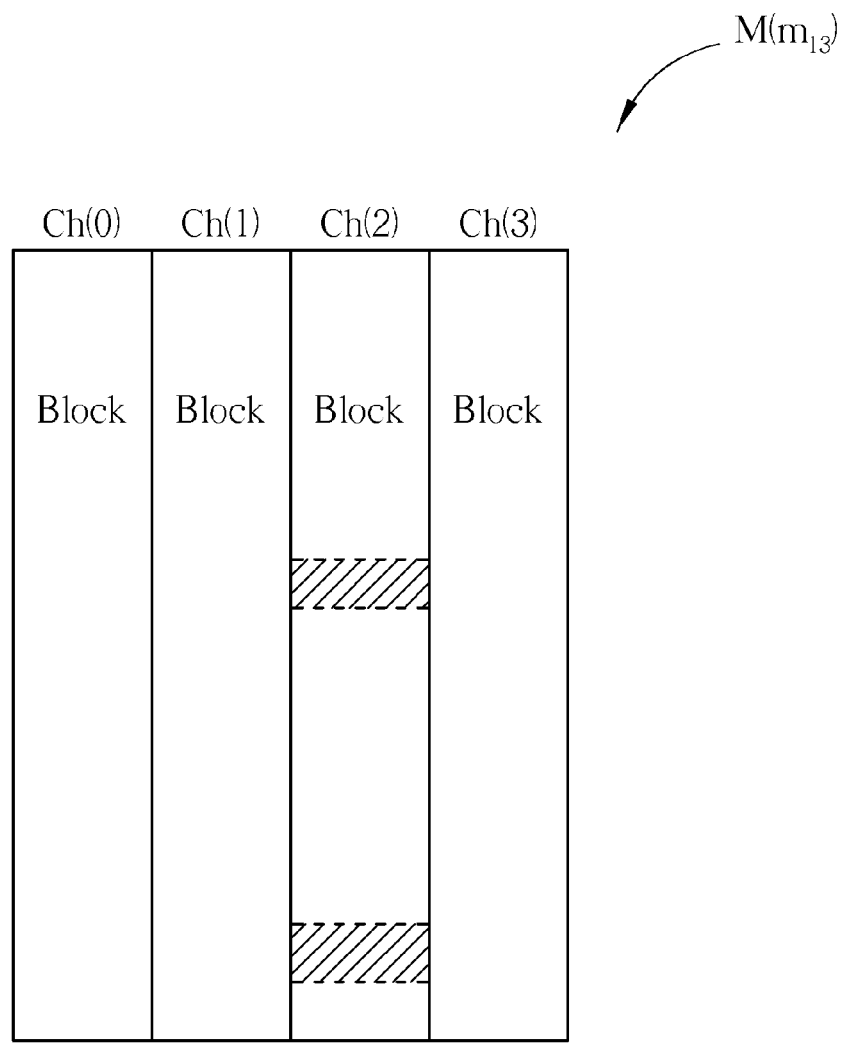
Figure 3D:
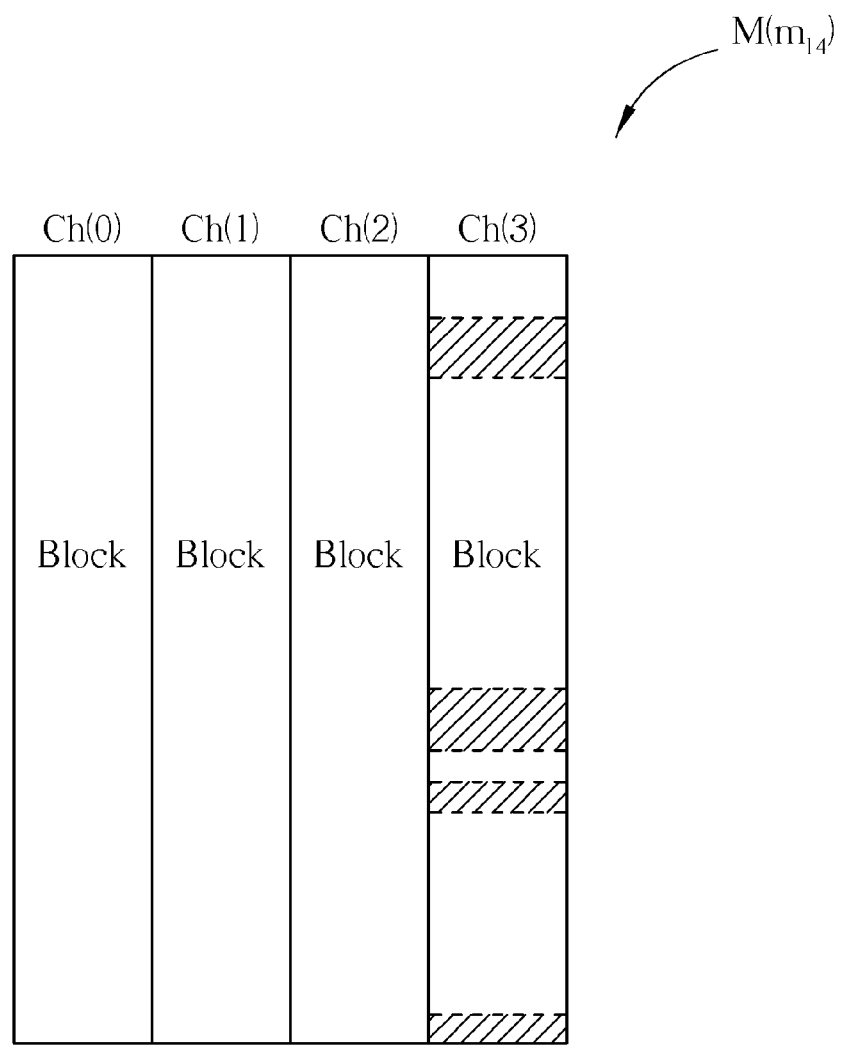
Figure 4A:
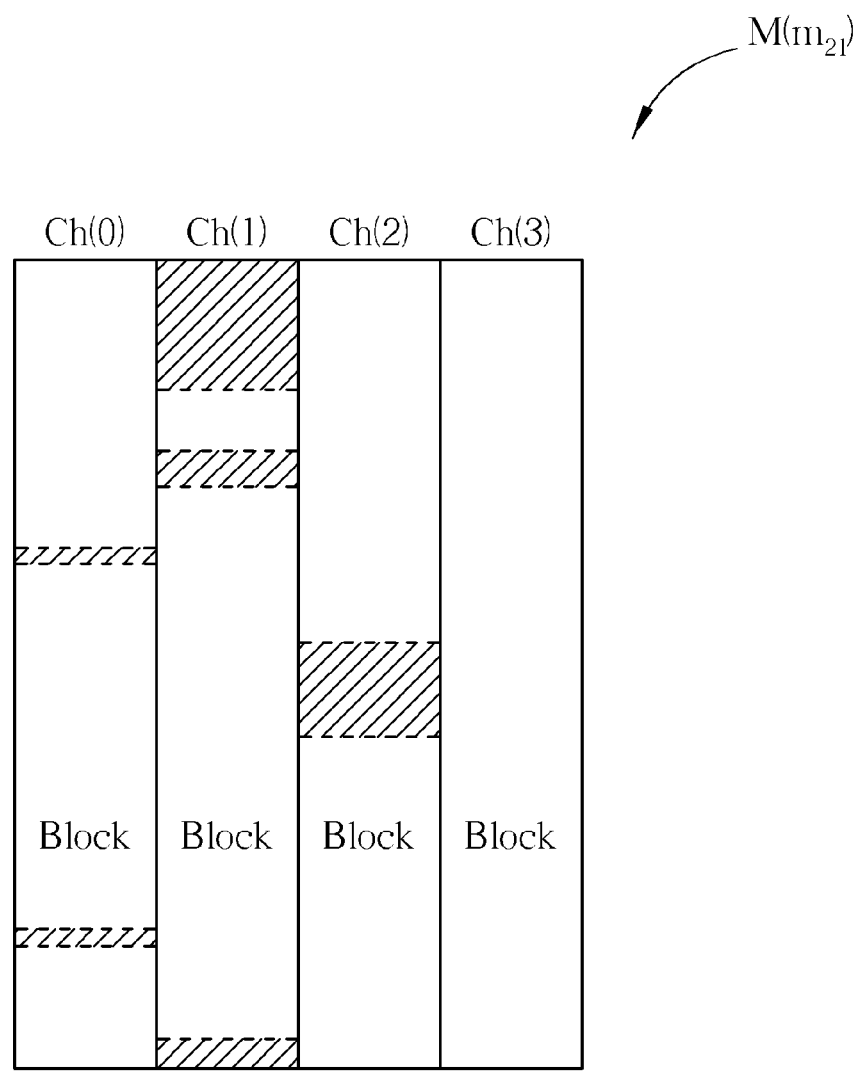
FIGS. 4A-4B respectively illustrate some candidate meta blocks involved with the method shown in FIG. 2A according to another embodiment of the present invention.
Figure 4B:
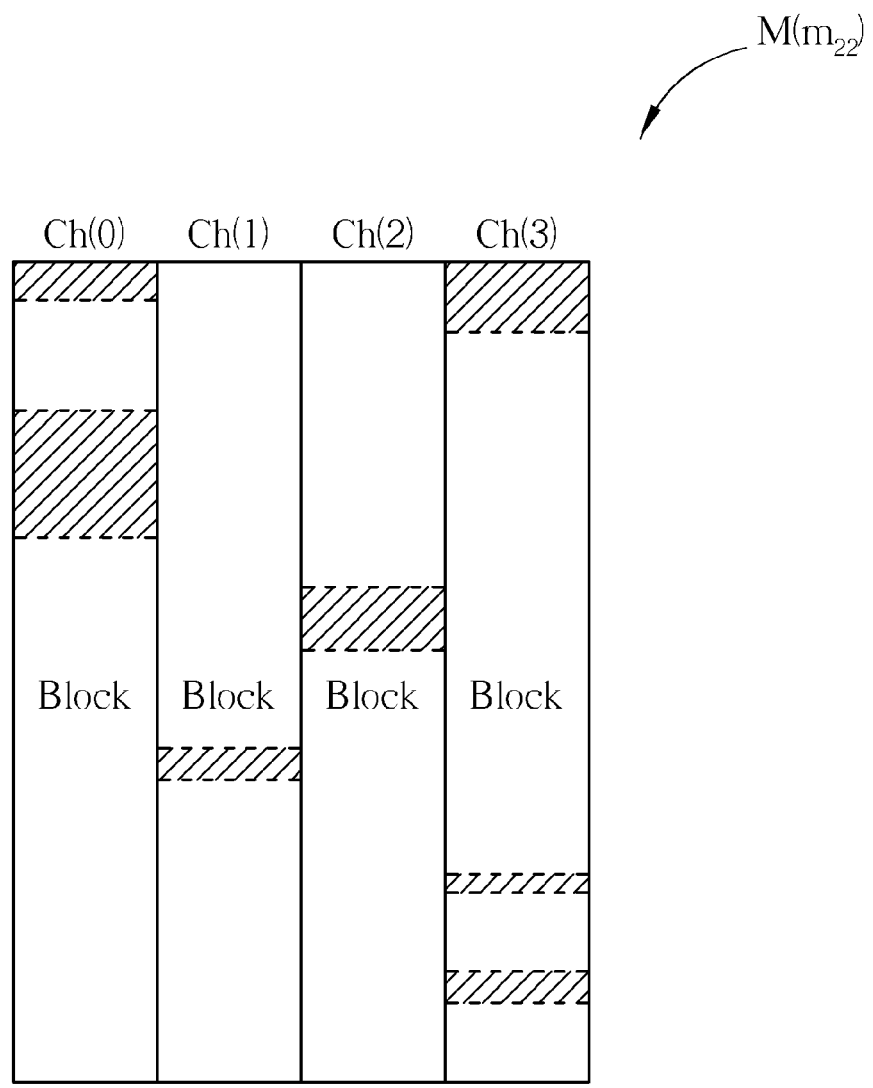

According to some embodiments, such as the embodiment shown in FIGS. 3A-3D and the embodiment shown in FIGS. 4A-4B, in a situation where the number N of the channels Ch(0), Ch(1), ..., and Ch(N-1) is equal to four, the aforementioned valid page counts {$VPC_m(0)$, $VPC_m(1)$, ..., $VPC_A(N-1)$} and the aforementioned accumulated values {$VPC_A(0)$, $VPC_A(1)$, ..., $VPC_A(N-1)$} can be written as {$VPC_m(0)$, $VPC_m(1)$, $VPC_m(2)$, $VPC_m(3)$} and {$VPC_A(0)$, $VPC_A(1)$, $VPC_A(2)$, $VPC_A(3)$}, respectively.

FIGS. 3A-3D respectively illustrate some candidate meta blocks $M(m_{11})$, $M(m_{12})$, $M(m_{13})$, and $M(m_{14})$ involved with the method 910 shown in FIG. 2A according to an embodiment of the present invention, where the shaded portions in the respective candidate meta blocks represent valid pages. For better comprehension, this embodiment is described according to the working flow shown in FIG. 2B.

First of all, after Step 932 is first entered, the controller selects the candidate meta block $M(m_{11})$ shown in FIG. 3A, with the respective valid page counts {$VPC_{m_{11}}(0)$, $VPC_{m_{11}}(1)$, $VPC_{m_{11}}(2)$, $VPC_{m_{11}}(3)$} thereof being (40, 0, 0, 0), so the controller accumulates the accumulated values {$VPC_A(0)$, $VPC_A(1)$, $VPC_A(2)$, $VPC_A(3)$} by changing them from a set of initial values (0, 0, 0, 0) to (40, 0, 0, 0). In this embodiment, the threshold value $TH_A$ is equal to 20 (i.e. $TH_A=20$). As the accumulated values {$VPC_A(0)$, $VPC_A(1)$, $VPC_A(2)$, $VPC_A(3)$} do not entirely reach the threshold value $TH_A$, Step 932 is re-entered.

Next, the controller selects the candidate meta block $M(m_{12})$ shown in FIG. 3B, with the respective valid page counts $\{VPC_{m_{12}}(0), VPC_{m_{12}}(1), VPC_{m_{12}}(2), VPC_{m_{12}}(3)\}$ thereof being (0, 28, 0, 0), so the controller accumulates the accumulated values $\{VPC_A(0), VPC_A(1), VPC_A(2), VPC_A(3)\}$ by changing them from (40, 0, 0, 0) to (40, 28, 0, 0). As the accumulated values $\{VPC_A(0), VPC_A(1), VPC_A(2), VPC_A(3)\}$ do not entirely reach the threshold value $TH_A$, Step 932 is re-entered.

Afterward, the controller selects the candidate meta block $M(m_{13})$ shown in FIG. 3C, with the respective valid page counts $\{VPC_{m_{13}}(0), VPC_{m_{13}}(1), VPC_{m_{13}}(2), VPC_{m_{13}}(3)\}$ thereof being (0, 0, 39, 0), so the controller accumulates the accumulated values $\{VPC_A(0), VPC_A(1), VPC_A(2), VPC_A(3)\}$ by changing them from (40, 28, 0, 0) to (40, 28, 39, 0). As the accumulated values $\{VPC_A(0), VPC_A(1), VPC_A(2), VPC_A(3)\}$ do not entirely reach the threshold value $TH_A$, Step 932 is re-entered.

In addition, the controller selects the candidate meta block $M(m_{14})$ shown in FIG. 3D, with the respective valid page counts $\{VPC_{m_{14}}(0), VPC_{m_{14}}(1), VPC_{m_{14}}(2), VPC_{m_{14}}(3)\}$ thereof being (0, 0, 0, 57), so the controller accumulates the accumulated values $\{VPC_A(0), VPC_A(1), VPC_A(2), VPC_A(3)\}$ by changing them from (40, 28, 39, 0) to (40, 28, 39, 57). As the accumulated values $\{VPC_A(0), VPC_A(1), VPC_A(2), VPC_A(3)\}$ do entirely reach the threshold value $TH_A$, Step 934 is entered.

Please note that, as the controller can simultaneously move/copy the valid data respectively corresponding to the channels $\{Ch(0), Ch(1), Ch(2), Ch(3)\}$ during the cleaning operation, the aforementioned ratio $R_{ALL\_CH}$ in this embodiment can be much greater than that of the related art. Therefore, the present invention can greatly enhance the overall processing performance of the memory device.

FIGS. 4A-4B respectively illustrate some candidate meta blocks $M(m_{21})$ and $M(m_{22})$ involved with the method 910 shown in FIG. 2A according to another embodiment of the present invention, where the shaded portions in the respective candidate meta blocks represent valid pages. For better comprehension, this embodiment is described according to the working flow shown in FIG. 2B.

First of all, after Step 932 is first entered, the controller selects the candidate meta block $M(m_{21})$ shown in FIG. 4A, with the respective valid page counts $\{VPC_{m_{21}}(0), VPC_{m_{21}}(1), VPC_{m_{21}}(2), VPC_{m_{21}}(3)\}$ thereof being (10, 60, 28, 0), so the controller accumulates the accumulated values $\{VPC_A(0), VPC_A(1), VPC_A(2), VPC_A(3)\}$ by changing them from a set of initial values (0, 0, 0, 0) to (10, 60, 28, 0). Please note that, when selecting a meta block as a candidate meta block such as the candidate meta block $M(m_{21})$, the controller can determine (more particularly, determine which meta block should be selected) according to the valid page counts. For example, the controller can refer to the valid page count table 120V, in order to select a meta block having the least number of valid pages as the initial candidate meta block $M(m_{21})$. In this embodiment, the threshold value $TH_A$ is equal to 20 (i.e. $TH_A=20$). As the accumulated values $\{VPC_A(0), VPC_A(1), VPC_A(2), VPC_A(3)\}$ do not entirely reach the threshold value $TH_A$, Step 932 is re-entered.

According to this embodiment, when it is detected that a difference $VPC_{A\_DIFF}$ between a maximum accumulated value $VPC_{A\_MAX}$ and a minimum accumulated value $VPC_{A\_MIN}$ within the accumulated values $\{VPC_A(0), VPC_A(1), VPC_A(2), VPC_A(3)\}$ reaches a second threshold value such as the threshold value $TH_D$, the controller temporarily selects a meta block having compensation characteristics as a candidate meta block, where the maximum accumulated value $VPC_{A\_MAX}$ and the minimum accumulated value $VPC_{A\_MIN}$ respectively correspond to two channels of the channels $\{Ch(0), Ch(1), Ch(2), Ch(3)\}$, with the two channels being temporarily referred to as a maximum channel $Ch_{MAX}$ and a minimum channel $Ch_{MIN}$ at this moment, respectively. On the contrary, within the meta block having the compensation characteristics, the valid page count of the block corresponding to the maximum channel $Ch_{MAX}$ is less than the valid page count of the block corresponding to the minimum channel $Ch_{MIN}$. More particularly, when it is detected that the difference $VPC_{A\_DIFF}$ between the maximum accumulated value $VPC_{A\_MAX}$ and the minimum accumulated value $VPC_{A\_MIN}$ within the accumulated values $\{VPC_A(0), VPC_A(1), VPC_A(2), VPC_A(3)\}$ reach the second threshold value such as the threshold value $TH_D$, the controller temporarily prevents selecting any meta block having no compensation characteristic as a candidate meta block, where within the meta block having no compensation characteristic, the valid page count of the block corresponding to the maximum channel $Ch_{MAX}$ is greater than or equal to the valid page count of the block corresponding to the minimum channel $Ch_{MIN}$.

In this embodiment, the threshold value $TH_D$ is equal to 40 (i.e. $TH_D=40$). After the controller selects the candidate meta block $M(m_{21})$, the maximum accumulated value $VPC_{A\_MAX}$ and the minimum accumulated value $VPC_{A\_MIN}$ are respectively the values 60 and 0 within (10, 60, 28, 0), so the maximum channel $Ch_{MAX}$ and the minimum channel $Ch_{MIN}$ are respectively the channels $Ch(1)$ and $Ch(3)$, and the difference $VPC_{A\_DIFF}$ is equal to 60. In this situation, $VPC_{A\_DIFF} > TH_D$, which means the next meta block to be selected (e.g. a meta block $M(m)$ under consideration) should have compensation characteristics. In practice, within the meta block $M(m)$ under consideration, when the valid page count $VPC_m(1)$ of a block corresponding to the channel $Ch(1)$ is less than the valid page count $VPC_m(3)$ of a block corresponding to the channel $Ch(3)$ (i.e. $VPC_m(1) < VPC_m(3)$), the meta block $M(m)$ to be selected can be regarded as a meta block having compensation characteristics.

As a result, the controller selects the candidate meta block $M(m_{22})$ shown in FIG. 4B, with the respective valid page counts $\{VPC_{m_{22}}(0), VPC_{m_{22}}(1), VPC_{m_{22}}(2), VPC_{m_{22}}(3)\}$ thereof being (50, 11, 20, 35), so the controller accumulates the accumulated values $\{VPC_A(0), VPC_A(1), VPC_A(2), VPC_A(3)\}$ by changing them from (10, 60, 28, 0) to (60, 71, 48, 35). As the accumulated values $\{VPC_A(0), VPC_A(1), VPC_A(2), VPC_A(3)\}$ do entirely reach the threshold value $TH_A$, Step 934 is entered.

Please note that, as the controller can simultaneously move/copy the valid data respectively corresponding to the channels $\{Ch(0), Ch(1), Ch(2), Ch(3)\}$ during the cleaning operation, the aforementioned ratio $R_{ALL\_CH}$ in this embodiment can be much greater than that of the related art. In addition, the controller can compensate the accumulated values by utilizing the meta blocks having compensation characteristics, in order to control the differences between the accumulated values $\{VPC_A(0), VPC_A(1), VPC_A(2), VPC_A(3)\}$ to be within a predetermined range (e.g. the range defined by the second threshold value such as the threshold value $TH_D$), so the aforementioned ratio $R_{ALL\_CH}$ in this embodiment can be much greater than that of the related art. Therefore, the present invention can greatly enhance the overall processing performance of the memory device.

In the embodiment shown in FIGS. 4A-4B, the threshold value $TH_D$ can be a fixed value. This is for illustrative purposes only, and is not meant to be a limitation of the present invention. According to different variations of this embodiment, the controller can set the threshold value $TH_D$ in advance and/or dynamically adjust the threshold value $TH_D$, in order to control the aforementioned ratio $R_{ALL\_CH}$.

It is an advantage of the present invention that the block management implemented according to the present invention can ensure that the best processing performance of a Flash memory adapted to have multiple channel configurations can be achieved during a cleaning operation. In contrast to the related art, in a situation where the chip area and the associated costs are not greatly increased, the present invention can achieve the goal of giving consideration to both operation performance and system resource management.

Those skilled in the art will readily observe that numerous modifications and alterations of the device and method may be made while retaining the teachings of the invention.

What is claimed is:

1. A method for performing block management, the method being applied to a controller of a Flash memory, which has multiple channels and comprises blocks corresponding to the multiple channels, the method comprising:
   selecting a meta block comprising a plurality of blocks, wherein each block of the plurality of blocks corresponds to a respective channel of the multiple channels;
   accumulating valid page counts of each block of the meta block to generate a plurality of accumulated values respectively corresponding to the channels; and
   when it is detected that all of the accumulated values reach a first threshold value, triggering the meta block into cleaning operation to simultaneously move/copy valid data respectively corresponding to the channels.

2. The method of claim 1, wherein the step of selecting the meta block further comprises:
   storing an index of the meta block in a clean list temporarily.

3. The method of claim 2, wherein the step of triggering the meta block into cleaning operation further comprises:
   triggering the meta block indicated by the index into cleaning operation.

4. The method of claim 2, after the triggering step, further comprising:
   removing the index from the clean list.

5. The method of claim 1, wherein the step of selecting the meta block further comprises:
   when it is detected that a difference between the maximum accumulated value and the minimum accumulated value within the accumulated values reaches a second threshold value, temporarily selecting a meta block having compensation characteristics, wherein the maximum accumulated value and the minimum accumulated value respectively correspond to a first channel and a second channel, the valid page count corresponding to the first channel is less than the valid page count corresponding to the second channel.

6. The method of claim 5, wherein the step of selecting the meta block further comprises:
   when it is detected that the difference between the maximum accumulated value and the minimum accumulated value within the accumulated values reaches the second threshold value, temporarily preventing selecting any meta block having no compensation characteristic, the valid page count corresponding to the first channel is greater than or equal to the valid page count corresponding to the second channel.

7. A memory device, comprising:
   a Flash memory having multiple channels and comprising blocks which are respectively corresponding to the channels; and
   a controller arranged to select a meta block and to accumulate respective valid page counts of blocks of the meta block;
   wherein when it is detected that all of the accumulated values reach a first threshold value, the controller triggers the meta block into cleaning operation to simultaneously move/copy valid data respectively corresponding to the channels.

8. The memory device of claim 7, wherein the controller is further arranged to temporarily store an index of the meta block in a clean list.

9. The memory device of claim 8, wherein the controller triggers the meta block indicated by the index into cleaning operation.

10. The memory device of claim 8, wherein after triggering the meta block into the cleaning operation, the controller removes the index from the clean list.

11. The memory device of claim 7, wherein when it is detected that a difference between the maximum accumulated value and the minimum accumulated value within the accumulated values reaches a second threshold value, the controller temporarily selects a meta block having compensation characteristic; and the maximum accumulated value and the minimum accumulated value respectively correspond to a first channel and a second channel, the valid page count corresponding to the first channel is less than the valid page count corresponding to the second channel.

12. The memory device of claim 11, wherein when it is detected that the difference between the maximum accumulated value and the minimum accumulated value within the accumulated values reaches the second threshold value, the controller temporarily prevents selecting any meta block having no compensation characteristic; the valid page count corresponding to the first channel is greater than or equal to the valid page count corresponding to the second channel.

13. A controller of a memory device, the controller being utilized for accessing a Flash memory, which has multiple channels and comprises blocks respectively corresponding to the channels, the controller comprising:
   a read only memory (ROM) arranged to store a program code; and
   a microprocessor arranged to execute the program code to control the access to the Flash memory, wherein the controller that executes the program code by utilizing the microprocessor selects a meta block and accumulates respective valid page counts of blocks respectively corresponding to the channels to generate accumulated values respectively corresponding to the channels;
   wherein when it is detected that all of the accumulated values reach a first threshold value, the controller executing the program code by utilizing the microprocessor triggers the meta block into a cleaning operation to simultaneously move/copy valid data respectively corresponding to the channels.

14. The controller of claim 13, wherein the controller that executes the program code by utilizing the microprocessor temporarily stores an index of the meta block in a clean list.

15. The controller of claim 14, wherein when it is detected that all of the accumulated values reach the first threshold value, the controller that executes the program code by utilizing the microprocessor triggers the block indicated by the index into cleaning operation to simultaneously move/copy the valid data respectively corresponding to the channels.

16. The controller of claim 14, wherein after triggering the meta block into cleaning operation, the controller that executes the program code by utilizing the microprocessor removes the index from the clean list.

17. The controller of claim 13, wherein when it is detected that a difference between the maximum accumulated value and the minimum accumulated value within the accumulated values reaches a second threshold value, the controller that executes the program code by utilizing the microprocessor temporarily selects a meta block having compensation characteristics; and the maximum accumulated value and the minimum accumulated value respectively correspond to a first channel and a second channel within the channels, the valid page count corresponding to the first channel is less than the valid page count corresponding to the second channel.

18. The controller of claim 17, wherein when it is detected that the difference between the maximum accumulated value and the minimum accumulated value within the accumulated values reaches the second threshold value, the controller that executes the program code by utilizing the microprocessor temporarily prevents selecting any meta block having no compensation characteristic, the valid page count corresponding to the first channel is greater than or equal to the valid page count corresponding to the second channel.

19. A method for performing Flash memory management, the method being applied to a controller of a Flash memory, which has multiple channels and comprises blocks corresponding to the multiple channels, the method comprising:
  selecting a meta block comprising a plurality of blocks, wherein each block of the plurality of blocks corresponds to a respective channel of the multiple channels;
  accumulating valid page counts of each block of the plurality of blocks to generate a plurality of accumulated values respectively corresponding to the channels; and
  triggering the meta block into cleaning operation to simultaneously move/copy valid data respectively corresponding to the channels when all of the accumulated values reach a first threshold value.

20. The method of claim 19, wherein after the step of selecting the meta block, the method further comprises:
  storing an index of the meta block in a clean list temporarily.

21. The method of claim 20, wherein the step of triggering the meta block into cleaning operation further comprises:
  triggering the meta block indicated by the index into cleaning operation to simultaneously move/copy valid data respectively corresponding to the channels when all of the accumulated values reach the first threshold value.

22. The method of claim 20, after the triggering step, further comprising:
  removing the index from the clean list.

23. The method of claim 19, wherein regarding the step of selecting the meta block, the meta block comprises at least one valid page.

24. A memory device, comprising:
  a Flash memory having multiple channels and comprising blocks respectively corresponding to the channels; and
  a controller arranged to access the Flash memory, wherein the controller is utilized for selecting a meta block having blocks, for accumulating valid page counts of blocks respectively corresponding to the channels, and for triggering the meta block into cleaning operation to simultaneously move/copy valid data respectively corresponding to the channels when all of the accumulated values reach a first threshold value.

25. The memory device of claim 24, wherein the controller stores an index of the meta block in a clean list temporarily.

26. The memory device of claim 25, wherein the controller is utilized for triggering the meta block indicated by the index into cleaning operation to simultaneously move/copy valid data respectively corresponding to the channels when all of the accumulated values reach the first threshold value.

27. The memory device of claim 25, wherein the controller is utilized for removing the index from the clean list after triggering the cleaning operation.

* * * * *